United States Patent
Inoue (10) Patent No.: US 12,481,522 B2
(45) Date of Patent: Nov. 25, 2025

(54) USER-LEVEL THREADING FOR SIMULATING MULTI-CORE PROCESSOR

(71) Applicant: INTERNATIONAL BUSINESS MACHINES CORPORATION, Armonk, NY (US)

(72) Inventor: Hiroshi Inoue, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 775 days.

(21) Appl. No.: 17/546,677

(22) Filed: Dec. 9, 2021

(65) Prior Publication Data

US 2023/0185601 A1 Jun. 15, 2023

(51) Int. Cl.
G06F 9/48 (2006.01)

(52) U.S. Cl.
CPC ...... *G06F 9/4843* (2013.01); *G06F 2209/483* (2013.01)

(58) Field of Classification Search
CPC ............................................. G06F 30/33–337
See application file for complete search history.

(56) References Cited

U.S. PATENT DOCUMENTS

| | | | | |
|---|---|---|---|---|
| 6,466,898 B1 * | 10/2002 | Chan | ...................... | G06F 30/33 716/108 |
| 7,496,490 B2 | 2/2009 | Tatsuoka et al. | | |
| 8,768,678 B1 * | 7/2014 | Mihalache | .............. | G06F 30/20 717/149 |

(Continued)

FOREIGN PATENT DOCUMENTS

| | | |
|---|---|---|
| CN | 101706742 A | 5/2010 |
| EP | 1065611 A2 | 1/2001 |
| WO | 2023/103773 A1 | 6/2023 |

OTHER PUBLICATIONS

Graphite: A Distributed Parallel Simulator for Multicores Jason E. Miller, Harshad Kasture, George Kurian, Nathan Beckmann, Charles Gruenwald III, Christopher Celio, Jonathan Eastep, and Anant Agarwal (Year: 2009).*

(Continued)

*Primary Examiner* — April Y Blair
*Assistant Examiner* — Paul V Mills
(74) *Attorney, Agent, or Firm* — Tutunjian & Bitetto, P.C.; Robert Richard Aragona (57) ABSTRACT

A method improves an execution speed of a host multi-core simulator simulating a target multi-core processor that has a hierarchical architecture including multiple corelets per core that, in turn include multiple functional units. The host multi-core simulator is implemented using multiple OS threads. The method selects layers in the hierarchical architecture to simulate on one of the OS threads, based on a shortest estimated layer execution time determined by (1.0+t/c*s)/min(c, t), wherein c is a number of cores in the simulator, t is a number of OS threads, and s is a threading overhead coefficient. The method respectively executes, from among the selected layers, a parallel simulation of the units therein that frequently communicate with each other on one of the multiple OS threads based on a communication frequency threshold, by assigning and using a respective user-level thread for each of the units from among a plurality of user-level threads.

19 Claims, 9 Drawing Sheets

(56) References Cited

U.S. PATENT DOCUMENTS

| | | | |
|---|---|---|---|
| 10,789,397 B2 | 9/2020 | Ventroux | |
| 11,636,244 B1* | 4/2023 | Gopalan | G06F 30/3308 716/100 |
| 2005/0066305 A1* | 3/2005 | Lisanke | G06F 30/33 717/135 |
| 2006/0229861 A1* | 10/2006 | Tatsuoka | G06F 11/261 714/E11.167 |
| 2007/0204271 A1 | 8/2007 | Gaiarsa et al. | |
| 2010/0274549 A1* | 10/2010 | Tal | G06F 30/3308 703/13 |
| 2011/0288833 A1* | 11/2011 | Osogami | G08G 1/0112 703/2 |
| 2011/0295587 A1* | 12/2011 | Eeckhout | G06F 11/3457 703/21 |
| 2012/0029900 A1 | 2/2012 | Papariello | |
| 2013/0290919 A1* | 10/2013 | Narayanaswamy | G06F 30/3323 716/106 |
| 2015/0095010 A1 | 4/2015 | Brock et al. | |
| 2015/0331713 A1* | 11/2015 | Mizrachi | G06F 30/33 718/104 |
| 2016/0275220 A1* | 9/2016 | Kenney | G06F 9/4881 |
| 2018/0173825 A1* | 6/2018 | Ventroux | G06F 9/46 |

OTHER PUBLICATIONS

MALsim: A Functional-Level Parallel Simulation Platform for CMPs Xiufeng Sui, Junmin Wu, Wei Yin, Dapeng Zhou, Zhe Gong (Year: 2010).*

Scalable and Retargetable Simulation Techniques for Multiprocessor Systems Heekyung Kim, Dukyoung Yun, Soonhoi Ha (Year: 2009).*

Parallelization of IBM Mambo System Simulator in Functional Modes Kun Wang, Yu Zhang, Huayong Wang, Xiaowei Shen (Year: 2008).*

Parallel Multi-core Verilog HDL Simulation based on Domain Partitioning Tariq B. Ahmad, Maciej Ciesielski (Year: 2014).*

The Art of Multiprocessor Programming Maurice Herlihy, Nir Shavit pp. 52-53, 141-144, 469-480 (Year: 2008).*

Generic Software for Emulating Multiprocessor Architectures Richard Mark Soley (Year: 1985).*

Search Report from PCT/CN2022/133697 dated Jan. 9, 2023. (9 pages).

Mell et al., "The NIST Definition of Cloud Computing", National Institute of Standards and Technology, Special Publication 800-145. Sep. 2011, pp. 1-7.

Ventroux, N. et al. "Highly-Parallel Special-Purpose Multicore Architecture for SystemC/TLM Simulations", 2014 International Conference on Embedded Computer Systems: Architectures, Modeling, and Simulation (Samos XIV). Jul. 14, 2014, pp. 250-257.

Iwasaki, Shintaro, et al. "BOLT: Optimizing OpenMP Parallel Regions with User-Level Threads", 2019 28th International Conference on Parallel Architectures and Compilation Techniques (PACT). Sep. 23, 2019, pp. 29-42.

Heirman, Wim, et al. "Sniper: Scalable and accurate parallel multi-core simulation", In8th International Summer School on Advanced Computer Architecture and Compilation for High-Performance and Embedded Systems (ACACES-2012), High-Performance and Embedded Architecture and Compilation Network of Excellence (HiPEAC). Dec. 31, 2011, pp. 91-94.

Malhotra, Geetika, et al. "ParTejas: A parallel simulator for multicore processors", ACM Transactions on Modeling and Computer Simulation (TOMACS). Jul. 2017, pp. 1-24.

Chung, Moo-Kyoung, et al. "SimParallel: A high performance parallel SystemC simulator using hierarchical multi-threading", In2014 IEEE International Symposium on Circuits and Systems (ISCAS). Jun. 1, 2014, pp. 1472-1475.

Shilpa, V. Jean, et al. "Design of User Level Threads for Multi-Core Processors Implemented on FPGA", International Journal of Scientific & Engineering Research, vol. 4, No. 11. Nov. 2013, pp. 1-6.

Venkataramani et al., "Efficient AI System Design With Cross-Layer Approximate Computing", Journals & Magazines, Proceedings of the IEEE, vol. 108 Issue: 12, 2020, pp. 2232-2250.

* cited by examiner

USER-LEVEL THREADING FOR SIMULATING MULTI-CORE PROCESSOR

BACKGROUND

The present invention generally relates to computer processing systems, and more particularly to user-level threading for simulating a multi-core processor.

When developing a new processor, such as a new deep learning accelerator, a software simulator of the processor is often used to develop software before the hardware becomes ready. The execution speed of the simulator is critically important for productivity of software developers especially for high-performance accelerators. Thence, there is a need to make the simulation of a multi-core processor faster.

SUMMARY

According to aspects of the present invention, a computer-implemented method is provided for improving an execution speed of a host multi-core simulator simulating a target multi-core processor that has a hierarchical architecture including multiple corelets per core that, in turn include multiple functional units. The host multi-core simulator is implemented using multiple operating system (OS) threads. The method includes selecting one or more layers in the hierarchical architecture of the target multi-core processor to simulate on one of the multiple OS threads, based on a shortest estimated layer execution time determined by $(1.0+t/c*s)/\min(c, t)$, wherein c is a number of cores in the host multi-core simulator, t is a number of the multiple OS threads, and s is a coefficient to estimate a threading overhead. The method further includes respectively executing, from among the selected one or more layers, a parallel simulation of the multiple functional units therein that frequently communicate with each other on one of the multiple OS threads based on a communication frequency threshold, by assigning and using a respective user-level thread for each of the multiple functional units from among a plurality of user-level threads. The method also includes skipping synchronization for a communication conflict between any of the multiple functional units that are simulated on the same OS thread.

According to other aspects of the present invention, a computer program product is provided for improving an execution speed of a host multi-core simulator of a computer simulating a target multi-core processor that has a hierarchical architecture including multiple corelets per core that, in turn include multiple functional units. The host multi-core simulator is implemented using multiple operating system (OS) threads. The computer program product includes a non-transitory computer readable storage medium having program instructions embodied therewith. The program instructions are executable by the computer to cause the computer to perform a method. The method includes selecting, by the host multi-core simulator, one or more layers in the hierarchical architecture of the target multi-core processor to simulate on one of the multiple OS threads, based on a shortest estimated layer execution time determined by $(1.0+t/c*s)/\min(c, t)$, wherein c is a number of cores in the host multi-core simulator, t is a number of the multiple OS threads, and s is a coefficient to estimate a threading overhead. The method further includes respectively executing, from among the selected one or more layers by the host multi-core simulator, a parallel simulation of the multiple functional units therein that frequently communicate with each other on one of the multiple OS threads based on a communication frequency threshold, by assigning and using a respective user-level thread for each of the multiple functional units from among a plurality of user-level threads. The method also includes skipping, by the host multi-core simulator, synchronization for a communication conflict between any of the multiple functional units that are simulated on the same OS thread.

According to yet other aspects of the present invention, a computer processing system is provided for improving an execution speed of a host multi-core simulator simulating a target multi-core processor that has a hierarchical architecture including multiple corelets per core that, in turn include multiple functional units. The host multi-core simulator is implemented using multiple operating system (OS) threads. The computer processing system includes a memory device for storing program code therein. The computer processing system further includes a processor device operatively coupled to the memory device for running the program code to select one or more layers in the hierarchical architecture of the target multi-core processor to simulate on one of the multiple OS threads, based on a shortest estimated layer execution time determined by $(1.0+t/c*s)/\min(c, t)$, wherein c is a number of cores in the host multi-core simulator, t is a number of the multiple OS threads, and s is a coefficient to estimate a threading overhead. The processor device further runs the program code to respectively execute, from among the selected one or more layers, a parallel simulation of the multiple functional units therein that frequently communicate with each other on one of the multiple OS threads based on a communication frequency threshold, by assigning and using a respective user-level thread for each of the multiple functional units from among a plurality of user-level threads. The processor device also runs the program code to skip synchronization for a communication conflict between any of the multiple functional units that are simulated on the same OS thread.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

Embodiments of the present invention are directed to user-level threading for simulating a multi-core processor.

Embodiments of the present invention make the simulation of a multi-core processor occur faster.

In embodiments of the present invention, both the target processor to simulate (also referred to as the "target") and the system that executes the simulator (also referred to as the "host") have multiple cores.

In embodiments of the present invention, the host is implemented using multiple threads for exploiting multiple central processing units (CPUs) of the host. Each thread simulates a small functional unit (e.g., a computation unit, a load unit, a store unit, etc.) of the target. In an embodiment, the threads communicate with each other via FIFOs.

In embodiments of the present invention, the target has a hierarchical architecture. For example, in an embodiment, the processor has multiple cores, each core including multiple corelets that, in turn, include multiple functional units. In other embodiments, the target may have a deeper hierarchy.

Figure 1:
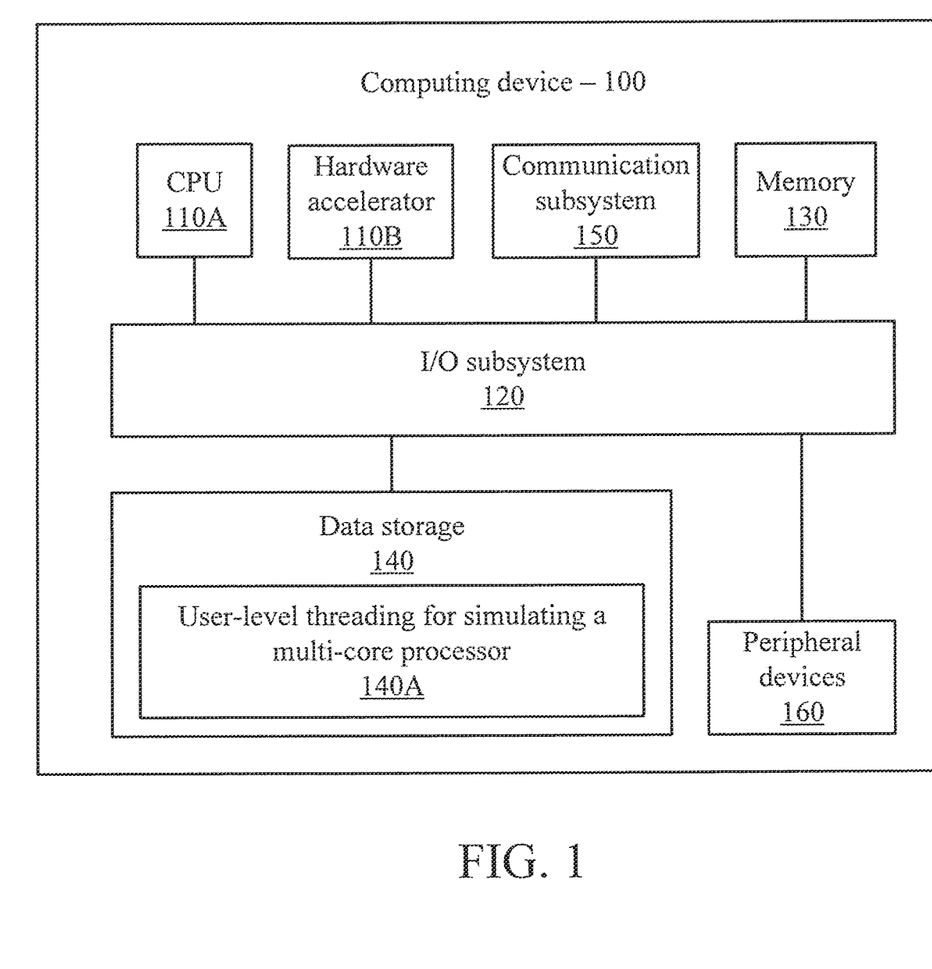
FIG. 1 is a block diagram showing an exemplary computing device, in accordance with an embodiment of the present invention.

FIG. 1 is a block diagram showing an exemplary computing device 100, in accordance with an embodiment of the present invention. The computing device 100 is configured to perform efficient user-level threading for simulating a multi-core processor.

The computing device 100 may be embodied as any type of computation or computer device capable of performing the functions described herein, including, without limitation, a computer, a server, a rack based server, a blade server, a workstation, a desktop computer, a laptop computer, a notebook computer, a tablet computer, a mobile computing device, a wearable computing device, a network appliance, a web appliance, a distributed computing system, a processor-based system, and/or a consumer electronic device. Additionally or alternatively, the computing device 100 may be embodied as a one or more compute sleds, memory sleds, or other racks, sleds, computing chassis, or other components of a physically disaggregated computing device. As shown in FIG. 1, the computing device 100 illustratively includes the processor 110, an input/output subsystem 120, a memory 130, a data storage device 140, and a communication subsystem 150, and/or other components and devices commonly found in a server or similar computing device. Of course, the computing device 100 may include other or additional components, such as those commonly found in a server computer (e.g., various input/output devices), in other embodiments. Additionally, in some embodiments, one or more of the illustrative components may be incorporated in, or otherwise form a portion of, another component. For example, the memory 130, or portions thereof, may be incorporated in the processor 110 in some embodiments.

The processor 110 may be embodied as any type of processor capable of performing the functions described herein. In an embodiment, the processor 110 is embodied as a Central Processing Unit (CPU) 110A and a deep learning hardware accelerator 110B. In an embodiment, the deep learning hardware accelerator 110B is a Graphics Processing Unit.

The memory 130 may be embodied as any type of volatile or non-volatile memory or data storage capable of performing the functions described herein. In operation, the memory 130 may store various data and software used during operation of the computing device 100, such as operating systems, applications, programs, libraries, and drivers. The memory 130 is communicatively coupled to the processor 110 via the I/O subsystem 120, which may be embodied as circuitry and/or components to facilitate input/output operations with the processor 110 the memory 130, and other components of the computing device 100. For example, the I/O subsystem 120 may be embodied as, or otherwise include, memory controller hubs, input/output control hubs, platform controller hubs, integrated control circuitry, firmware devices, communication links (e.g., point-to-point links, bus links, wires, cables, light guides, printed circuit board traces, etc.) and/or other components and subsystems to facilitate the input/output operations. In some embodiments, the I/O subsystem 120 may form a portion of a system-on-a-chip (SOC) and be incorporated, along with the processor 110, the memory 130, and other components of the computing device 100, on a single integrated circuit chip.

The data storage device 140 may be embodied as any type of device or devices configured for short-term or long-term storage of data such as, for example, memory devices and circuits, memory cards, hard disk drives, solid state drives, or other data storage devices. The data storage device 140 can store program code for efficient user-level threading for simulating a multi-core processor. The communication subsystem 150 of the computing device 100 may be embodied as any network interface controller or other communication circuit, device, or collection thereof, capable of enabling communications between the computing device 100 and other remote devices over a network. The communication subsystem 150 may be configured to use any one or more communication technology (e.g., wired or wireless communications) and associated protocols (e.g., Ethernet, Infiniband®, Bluetooth®, Wi-Fi®, WiMAX, etc.) to effect such communication.

As shown, the computing device 100 may also include one or more peripheral devices 160. The peripheral devices 160 may include any number of additional input/output devices, interface devices, and/or other peripheral devices. For example, in some embodiments, the peripheral devices 160 may include a display, touch screen, graphics circuitry, keyboard, mouse, speaker system, microphone, network interface, and/or other input/output devices, interface devices, and/or peripheral devices.

Of course, the computing device 100 may also include other elements (not shown), as readily contemplated by one of skill in the art, as well as omit certain elements. For example, various other input devices and/or output devices can be included in computing device 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized. Further, in another embodiment, a cloud configuration can be used (e.g., see FIGS. 6-7). These and other variations of the processing system 100 are readily contemplated by one of ordinary skill in the art given the teachings of the present invention provided herein.

As employed herein, the term "hardware processor subsystem" or "hardware processor" can refer to a processor, memory (including RAM, cache(s), and so forth), software (including memory management software) or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), FPGAs, and/or PLAs.

Figure 2:
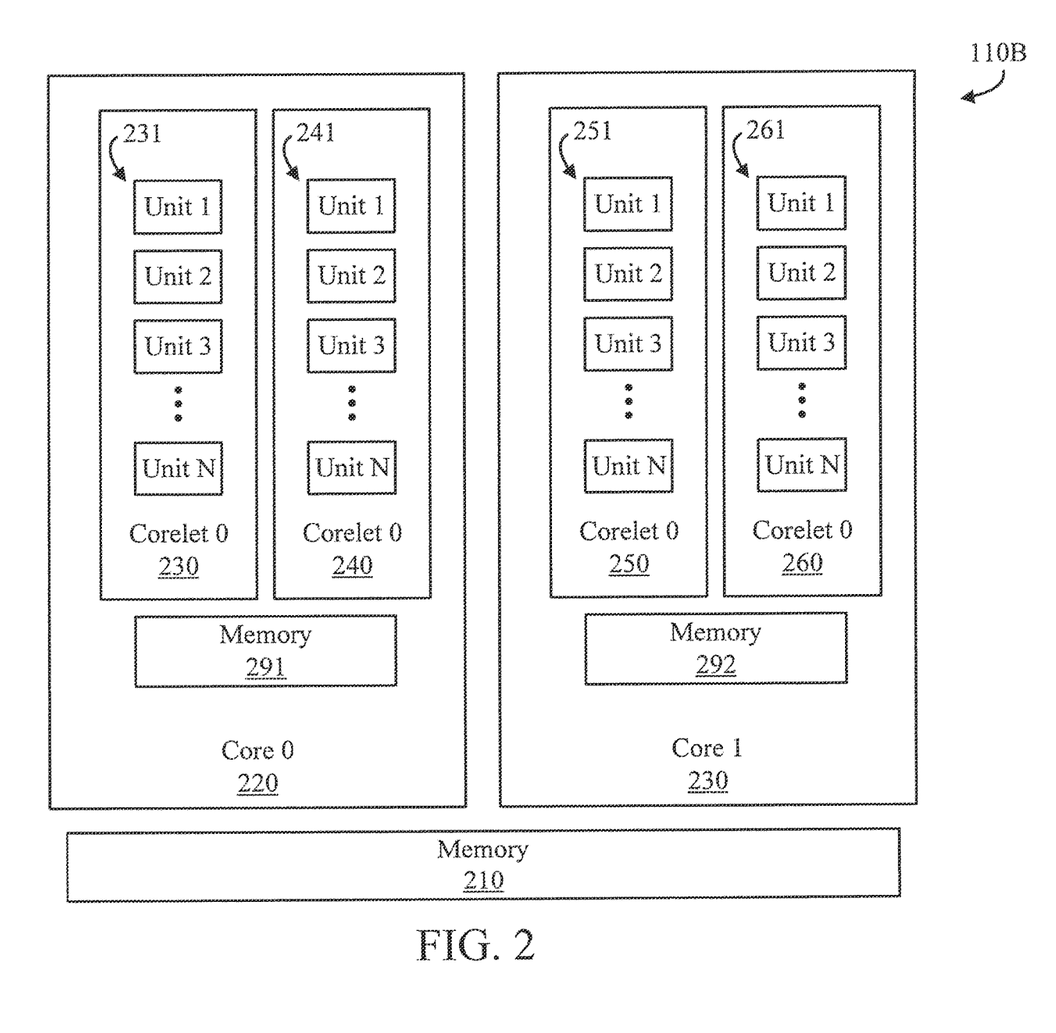
FIG. 2 is a block diagram showing an exemplary deep learning accelerator, in accordance with an embodiment of the present invention.

These and other variations of a hardware processor subsystem are also contemplated in accordance with embodiments of the present invention FIG. 2 is a block diagram showing an exemplary deep learning accelerator 110B, in accordance with an embodiment of the present invention.

The deep learning accelerator 110B interfaces with a memory 210, and includes a core 0 220 and a core 1 230.

Core 0 220 includes a corelet 0 230 and a corelet 1 240. Corelet 0 230 includes multiple functional units 231 1 through unit N. Corelet 1 240 includes multiple functional units 241 1 through N. Core 0 220 also includes a cache memory 291. A corelet is a layer in between a core and a functional unit. Other terms for a similar positioned layer can also apply.

Core 1 230 includes a corelet 0 250 and a corelet 1 260. Corelet 0 250 includes multiple functional units 251 1 through unit N. Corelet 1 260 includes multiple functional units 261 1 through N. Core 1 230 also includes a cache memory 292.

In another embodiment, one or more functional units can be shared between a different corelets.

In an embodiment, the simulator assigns a respective thread for each of the multiple functional units 231 and 241 in parallel, and for each of the multiple functional units 251 and 261 in parallel. In an embodiment, the simulator assigns a respective thread for each of the multiple functional units 231, 241, 251, and 261 in parallel. The functional units that are assigned a respective thread are those that frequently communicate with each other based on a communication frequency threshold. The communication frequency threshold can be implemented based on a spatial relationship between the elements such as the elements in a same corelet or in a same core, that is, in a same hierarchical layer(s).

The hierarchical layers that are selected from those that frequently communicate with each other are the hierarchical layers that give the smallest execution time in a performance estimation.

The top N hierarchical layers can be selected, where N is an integer equal to and greater than 1. In an embodiment, preferably multiple hierarchical layers are selected. For example, in an embodiment, all elements in same corelet are selected for parallel processing, and then repeated for a next same corelet until all corelets have been processed. In another or the same embodiment, all elements in a same core are selected for parallel processing, and then repeated for a next same core until all cores have been processed. These and other variations of selection are readily determined by one of ordinary skill in the art, given the teachings of the present invention provided herein.

Figure 3:
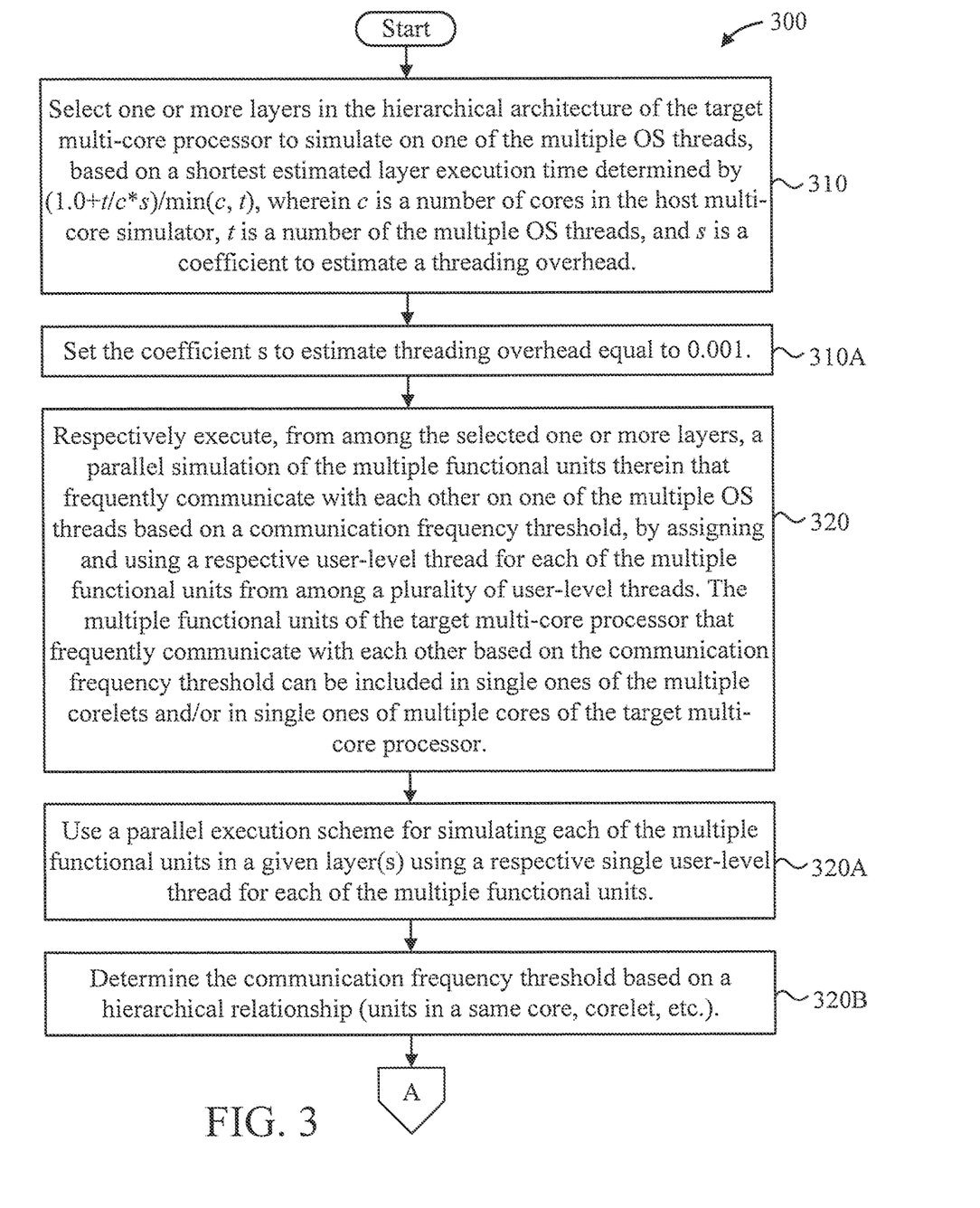
FIGS. 3-4 are flow diagrams showing an exemplary method for improving an execution speed of a host multi-core simulator simulating a target multi-core processor, in accordance with an embodiment of the present invention.
Figure 4:
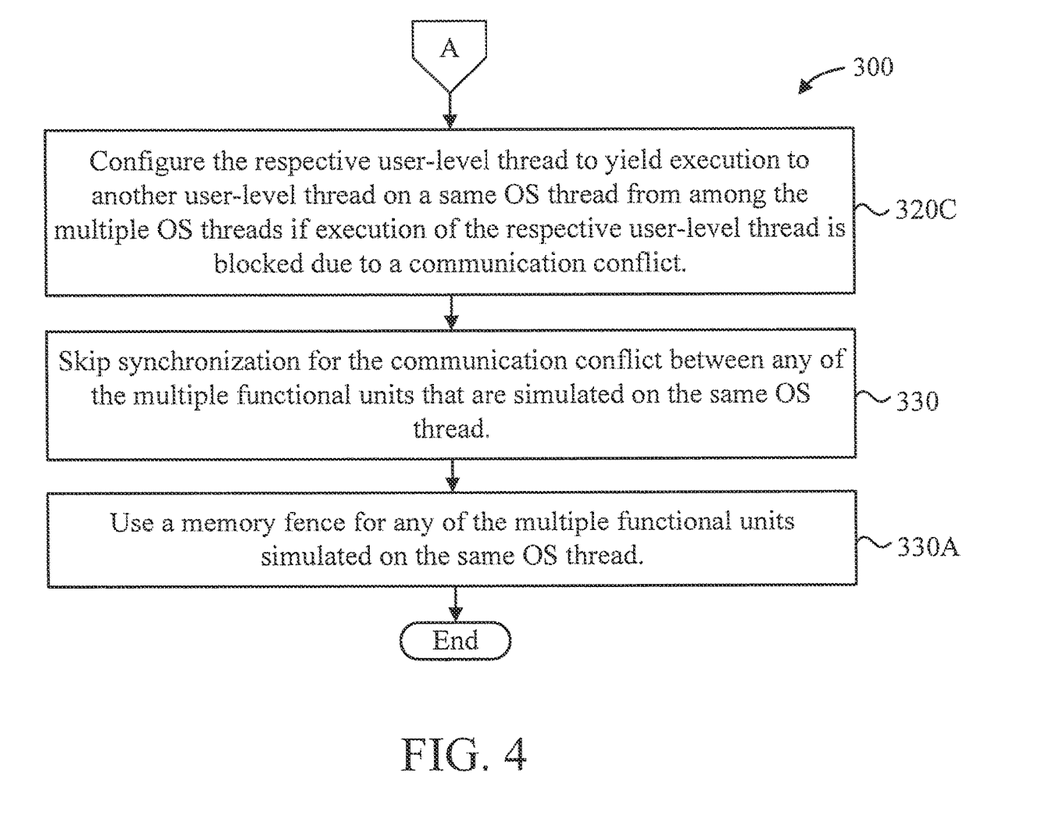

FIGS. 3-4 involve various types of threads including OS threads and user-level threads. An OS thread (or kernel thread) is a thread provided by an OS. Typically "thread" means OS thread. Multiple OS threads can run simultaneously on multiple cores. A user-level thread is a software implementation of thread functionality. Multiple user-level threads can run on an OS thread, but user-level threads assigned to the same OS thread cannot run simultaneously even on a multi-core system. A user-level thread is more light-weight in context switching than an OS thread. A user-level thread yields the execution to another user-level thread when its execution is blocked due to FIFO accesses, e.g. no data available when reading a FIFO As used herein, a communication conflict refers to the situation where there is no data available when reading a FIFO.

FIGS. 3-4 are flow diagrams showing an exemplary method 300 for improving an execution speed of a host multi-core simulator simulating a target multi-core processor, in accordance with an embodiment of the present invention.

In an embodiment, the target multi-core processor has a hierarchical architecture including multiple corelets per core that, in turn include multiple functional units. Hence, there can be a core layer(s), a corelet layer(s), a functional unit layer(s), and so forth. In an embodiment, the host multi-core simulator is implemented using multiple operating system (OS) threads. In an embodiment, the multiple OS threads communicate with each other via First-In First-Out units.

In an embodiment, a functional unit of the multiple functional units can be any of a computation unit, a load unit, and/or a store unit.

At block 310, select one or more layers in the hierarchical architecture of the target multi-core processor to simulate on one of the multiple OS threads, based on a shortest estimated layer execution time determined by $(1.0+t/c*s)/\min(c, t)$, wherein c is a number of cores in the host multi-core simulator, t is a number of the multiple OS threads, and s is a coefficient to estimate a threading overhead.

In an embodiment, block 310 can include block 310A.

At block 310A, set the coefficient s to estimate threading overhead equal to 0.001. Typically, s can have a value from a near-zero number, e.g. 1^-10 to 0.01. In an embodiment, s is empirically determined to better represent the measured performance by the model.

At block 320, respectively execute, from among the selected one or more layers, a parallel simulation of the multiple functional units therein that frequently communicate with each other on one of the multiple OS threads based on a communication frequency threshold, by assigning and using a respective user-level thread for each of the multiple functional units from among a plurality of user-level threads.

In an embodiment, the multiple functional units of the target multi-core processor that frequently communicate with each other based on the communication frequency threshold can be included in single ones of the multiple corelets and/or in single ones of multiple cores of the target multi-core processor.

In an embodiment, block 320 can include one or more of blocks 320A through 320C.

At block 320A, use a parallel execution scheme for simulating each of the multiple functional units in a given layer(s) using a respective single user-level thread for each of the multiple functional units.

At block 320B, determine the communication frequency threshold based on a hierarchical relationship (units in a same core, corelet, etc.).

At block 320C, configure the respective user-level thread to yield execution to another user-level thread on a same OS thread from among the multiple OS threads if execution of the respective user-level thread is blocked due to a communication conflict.

At block 330, skip synchronization for the communication conflict between any of the multiple functional units that are simulated on the same OS thread.

In an embodiment, block 330 can include block 330A.

At block 330A, use a memory fence for any of the multiple functional units simulated on the same OS thread.

Thus, for a given application, one or more hierarchical layers that are used by the application are simulated and non-used layers are not simulated in order to determine a simulated execution time of the application as representative of an actual execution time.

The hierarchical layers to be simulated are determined and limited using the above equation based on the number of cores of the host, the number of OS thread, and the coefficient to estimate threading overhead, and then further limiting the method to testing functional units that communicate greater than a threshold amount based on, e.g., a hierarchical layer relationship. The hierarchical layer relationship can involve, for example, being in the same core or corelet. Depending upon the hierarchy depth, other hierarchical relationships can be included.

Figure 5:
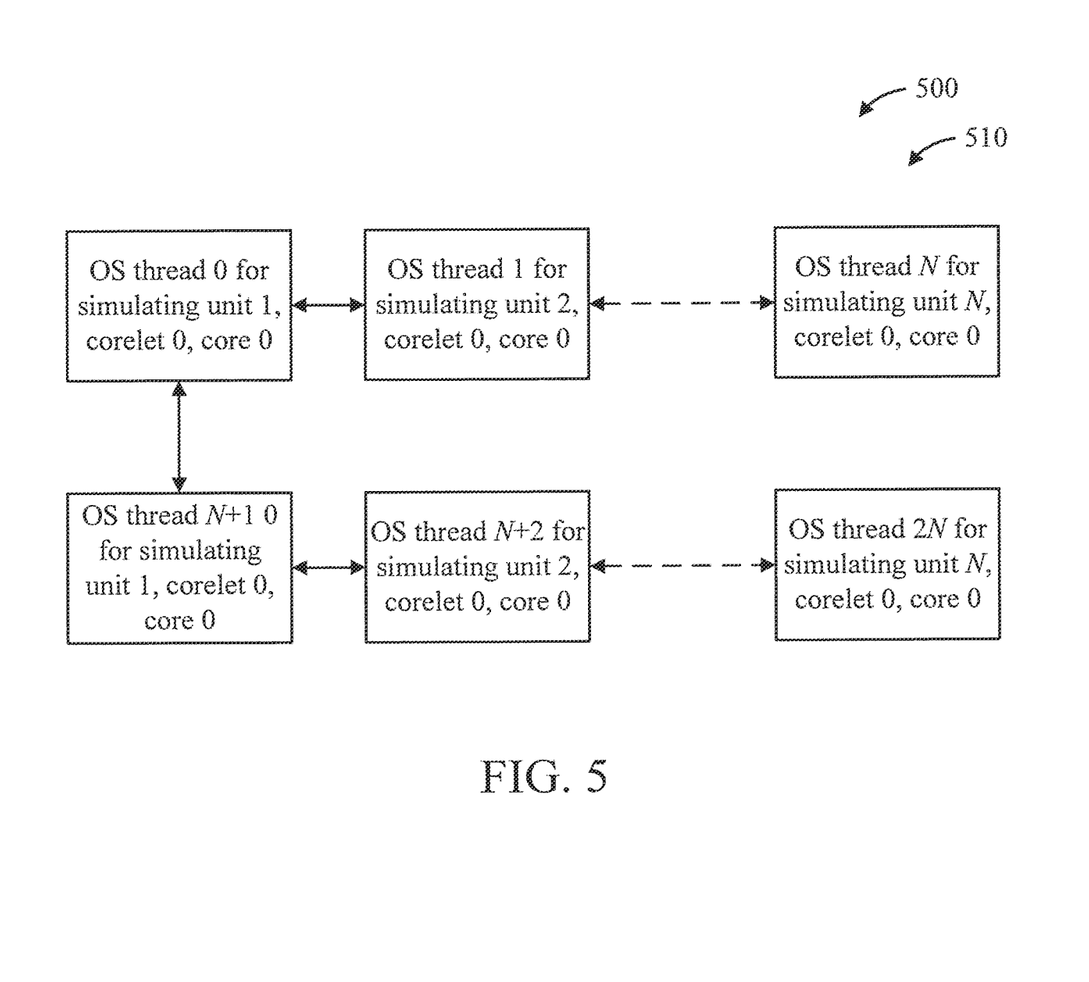
FIG. 5 is a block diagram showing an exemplary unit layer selection for OS threads, in accordance with an embodiment of the present invention.

FIG. 5 is a block diagram showing an exemplary unit layer selection 500 for OS threads 510, in accordance with an embodiment of the present invention.

Figure 6:
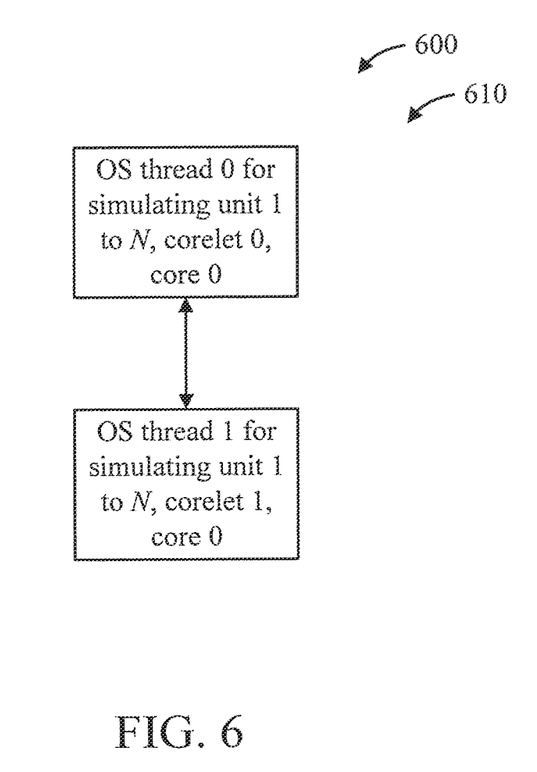
FIG. 6 is a block diagram showing an exemplary corelet layer selection for OS threads, in accordance with an embodiment of the present invention.

FIG. 6 is a block diagram showing an exemplary corelet layer selection 600 for OS threads 610, in accordance with an embodiment of the present invention.

N user-level threads are running on an OS thread for simulating N units.

Figure 7:
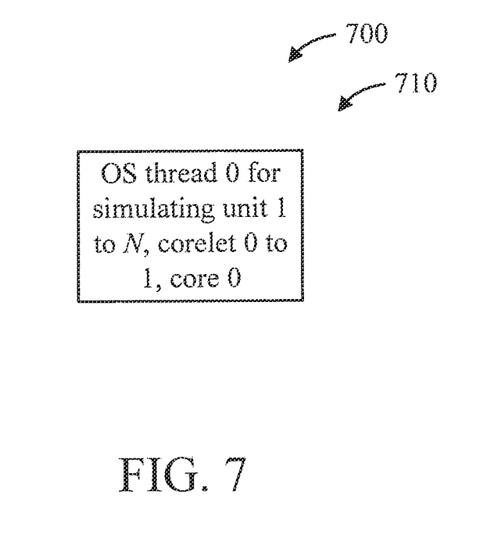
FIG. 7 is a block diagram showing an exemplary core layer selection for OS threads, in accordance with an embodiment of the present invention.

FIG. 7 is a block diagram showing an exemplary core layer selection 700 for OS threads 710, in accordance with an embodiment of the present invention.

2N user-level threads are running on an OS thread for simulating 2N units.

In an embodiment, efficient user-level threading for simulating a multi-core processor can be performed in the cloud. In an embodiment, a cloud-based multi-core processor simulator service can be provided in the cloud. In this way, simulations can be performed for new processors considering being added to a given cloud architecture.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
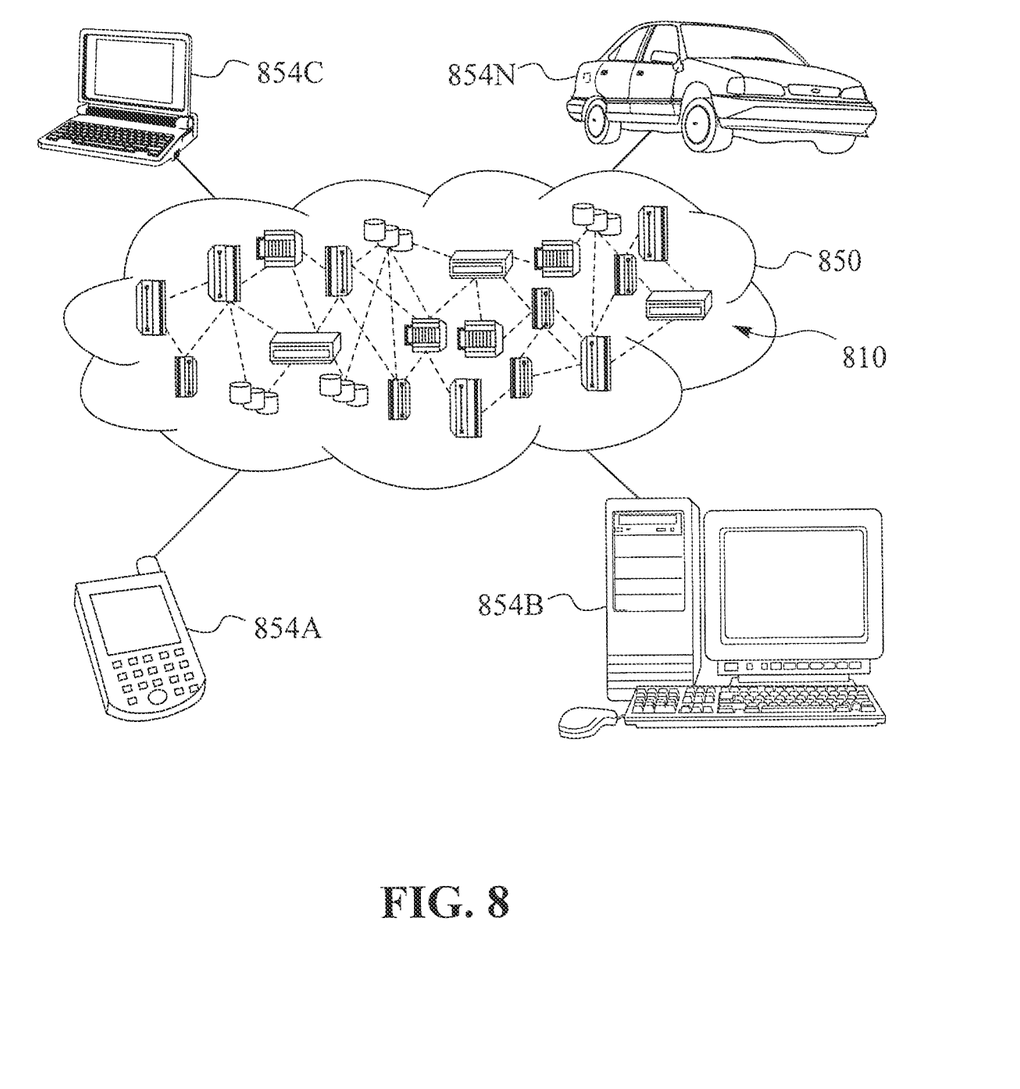
FIG. 8 is a block diagram showing an illustrative cloud computing environment having one or more cloud computing nodes with which local computing devices used by cloud consumers communicate, in accordance with an embodiment of the present invention.

Referring now to FIG. 8, illustrative cloud computing environment 850 is depicted. As shown, cloud computing environment 850 includes one or more cloud computing nodes 810 with which local computing devices used by cloud consumers, such as, for example, personal digital assistant (PDA) or cellular telephone 854A, desktop computer 854B, laptop computer 854C, and/or automobile computer system 854N may communicate. Nodes 810 may communicate with one another. They may be grouped (not shown) physically or virtually, in one or more networks, such as Private, Community, Public, or Hybrid clouds as described hereinabove, or a combination thereof. This allows cloud computing environment 850 to offer infrastructure, platforms and/or software as services for which a cloud consumer does not need to maintain resources on a local computing device. It is understood that the types of computing devices 854A-N shown in FIG. 6 are intended to be illustrative only and that computing nodes 810 and cloud computing environment 650 can communicate with any type of computerized device over any type of network and/or network addressable connection (e.g., using a web browser).

Figure 9:
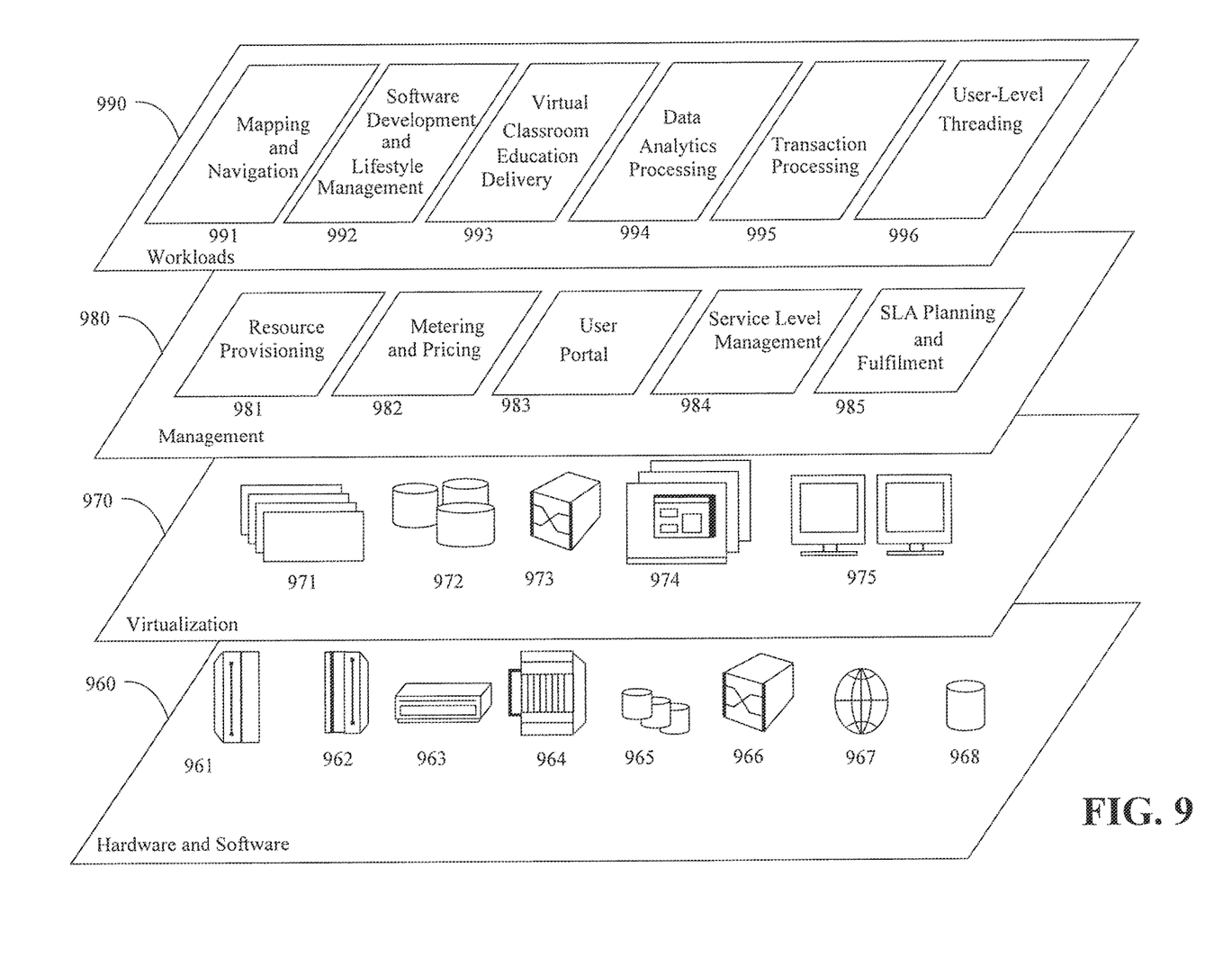
FIG. 9 is a block diagram showing a set of functional abstraction layers provided by a cloud computing environment, in accordance with an embodiment of the present invention.

Referring now to FIG. 9, a set of functional abstraction layers provided by cloud computing environment 850 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 960 includes hardware and software components. Examples of hardware components include: mainframes 761; RISC (Reduced Instruction Set Computer) architecture based servers 962; servers 963; blade servers 964; storage devices 765; and networks and networking components 966. In some embodiments, software components include network application server software 967 and database software 968.

Virtualization layer 970 provides an abstraction layer from which the following examples of virtual entities may be provided: virtual servers 971; virtual storage 972; virtual networks 973, including virtual private networks; virtual applications and operating systems 974; and virtual clients 975.

In one example, management layer 980 may provide the functions described below. Resource provisioning 981 provides dynamic procurement of computing resources and other resources that are utilized to perform tasks within the cloud computing environment. Metering and Pricing 982 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 983 provides access to the cloud computing environment for consumers and system administrators. Service level management 984 provides cloud computing resource allocation and management such that required service levels are met. Service Level Agreement (SLA) planning and fulfillment 985 provide pre-arrangement for, and procurement of, cloud computing resources for which a future requirement is anticipated in accordance with an SLA.

Workloads layer 890 provides examples of functionality for which the cloud computing environment may be utilized. Examples of workloads and functions which may be provided from this layer include: mapping and navigation 891; software development and lifecycle management 892; virtual classroom education delivery 893; data analytics processing 894; transaction processing 895; and efficient user-level threading for simulating a multi-core processor 896.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A computer-implemented method for improving an execution speed of a host multi-core simulator simulating a target multi-core processor that has a hierarchical architecture including multiple corelets per core that, in turn include multiple functional units, wherein the host multi-core simulator is implemented using multiple operating system (OS) threads, the method comprising:

selecting one or more layers in the hierarchical architecture of the target multi-core processor to simulate on respective OS threads of the host multi-core simulator, based on a shortest estimated layer execution time determined by $(1.0+t/c*s)/\min(c, t)$, wherein c is a number of cores in the host multi-core simulator, t is a number of the multiple OS threads, and s is a coefficient to estimate a threading overhead; and respectively executing, from among the selected one or more layers, the OS threads on respective cores of the host multi-core simulator to perform a parallel simulation of the multiple functional units therein that frequently communicate with each other on one of the multiple OS threads based on a communication frequency threshold, by assigning and using a respective user-level thread for each of the multiple functional units from among a plurality of user-level threads with a parallel execution scheme for simulating each of the multiple functional units simultaneously by a respective one of a plurality of user-level threads, and skipping synchronization for a communication conflict between any of the multiple functional units that are simulated on the same OS thread.

2. The computer-implemented method of claim 1, wherein a functional unit of the multiple functional units is selected from a group consisting of a computation unit, a load unit, and a store unit.

3. The computer-implemented method of claim 1, wherein the multiple OS threads communicate with each other via First-In First-Out units.

4. The computer-implemented method of claim 1, wherein the multiple functional units of the target multi-core processor that frequently communicate with each other based on the communication frequency threshold are comprised in single ones of the multiple corelets of the target multi-core processor.

5. The computer-implemented method of claim 1, wherein the multiple functional units of the target multi-core processor that frequently communicate with each other based on the communication frequency threshold are comprised in single ones of multiple cores of the target multi-core processor.

6. The computer-implemented method of claim 1, wherein the multiple functional units of the target multi-core processor that frequently communicate with each other based on the communication frequency threshold are comprised in same respective hierarchical levels of the target multi-core processor.

7. The computer-implemented method of claim 1, wherein skipping communication comprises using a memory fence for any of the multiple functional units simulated on the same OS thread.

8. The computer-implemented method of claim 1, wherein the coefficient s to estimate threading overhead is set equal to 0.001.

9. The computer-implemented method of claim 1, wherein the host multi-core simulator comprises a central processing unit, and the target multi-core processor comprises a hardware accelerator.

10. The computer-implemented method of claim 9, wherein the hardware accelerator is a graphics processing unit.

11. The computer-implemented method of claim 1, wherein the host multi-core simulator and the target multi-core processor are comprised in two different computers.

12. The computer-implemented method of claim 1, wherein the respective user-level thread is configured to yield execution to another user-level thread on a same OS thread from among the multiple OS threads if execution of the respective user-level thread is blocked due to a communication conflict.

13. A computer program product for improving an execution speed of a host multi-core simulator of a computer simulating a target multi-core processor that has a hierarchical architecture including multiple corelets per core that, in turn include multiple functional units, wherein the host multi-core simulator is implemented using multiple operating system (OS) threads, the computer program product comprising a non-transitory computer readable storage medium having program instructions embodied therewith, the program instructions executable by the computer to cause the computer to perform a method comprising:

selecting, by the host multi-core simulator, one or more layers in the hierarchical architecture of the target multi-core processor to simulate on respective OS threads of the host multi-core simulator, based on a shortest estimated layer execution time determined by $(1.0+t/c*s)/\min(c, t)$, wherein c is a number of cores in the host multi-core simulator, t is a number of the multiple OS threads, and s is a coefficient to estimate a threading overhead; and respectively executing, from among the selected one or more layers, the OS threads on respective cores of the host multi-core simulator to perform a parallel simulation of the multiple functional units therein that frequently communicate with each other on one of the multiple OS threads based on a communication frequency threshold, by assigning and using a respective user-level thread for each of the multiple functional units from among a plurality of user-level threads with a parallel execution scheme for simulating each of the multiple functional units simultaneously by a respective one of a plurality of user-level threads, skipping, by the host multi-core simulator, synchronization for a communication conflict between any of the multiple functional units that are simulated on the same OS thread.

14. The computer program product of claim 13, wherein a functional unit of the multiple functional units is selected from a group consisting of a computation unit, a load unit, and a store unit.

15. The computer program product of claim 13, wherein the multiple OS threads communicate with each other via First-In First-Out units.

16. The computer program product of claim 13, wherein the multiple functional units of the target multi-core processor that frequently communicate with each other based on the communication frequency threshold are comprised in single ones of the multiple corelets of the target multi-core processor.

17. The computer program product of claim 13, wherein the multiple functional units of the target multi-core processor that frequently communicate with each other based on the communication frequency threshold are comprised in single ones of multiple cores of the target multi-core processor.

18. The computer program product of claim 13, wherein the multiple functional units of the target multi-core processor that frequently communicate with each other based on the communication frequency threshold are comprised in same respective hierarchical levels of the target multi-core processor.

19. A computer processing system for improving an execution speed of a host multi-core simulator simulating a target multi-core processor that has a hierarchical architecture including multiple corelets per core that, in turn include multiple functional units, wherein the host multi-core simulator is implemented using multiple operating system (OS) threads, the computer processing system comprising:
  a memory device for storing program code therein; and
  a processor device operatively coupled to the memory device for running the program code to:
    select one or more layers in the hierarchical architecture of the target multi-core processor to simulate on respective OS threads of the host multi-core simulator, based on a shortest estimated layer execution time determined by $(1.0+t/c*s)/\min(c, t)$, wherein c is a number of cores in the host multi-core simulator, t is a number of the multiple OS threads, and s is a coefficient to estimate a threading overhead; and
    respectively execute, from among the selected one or more layers, the OS threads on respective cores of the host multi-core simulator to perform a parallel simulation of the multiple functional units therein that frequently communicate with each other on one of the multiple OS threads based on a communication frequency threshold, by assigning and using a respective user-level thread for each of the multiple functional units from among a plurality of user-level threads with a parallel execution scheme for simulating each of the multiple functional units simultaneously by a respective one of a plurality of user-level threads, skip synchronization for a communication conflict between any of the multiple functional units that are simulated on the same OS thread.

* * * * *